(12) United States Patent
Yamabana (10) Patent No.: US 7,899,329 B2
(45) Date of Patent: Mar. 1, 2011

(54) TRANSMISSION SYSTEM AND TRANSMISSION APPARATUS

(75) Inventor: Tetsuji Yamabana, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 609 days.

(21) Appl. No.: 12/010,751

(22) Filed: Jan. 29, 2008

(65) Prior Publication Data

US 2008/0187317 A1 Aug. 7, 2008

(30) Foreign Application Priority Data

Feb. 1, 2007 (JP) ............................ 2007-022536

(51) Int. Cl.
 *H04J 14/00* (2006.01)
 *H04B 10/00* (2006.01)
(52) U.S. Cl. ........................................ 398/66; 398/154
(58) Field of Classification Search .................. 398/66, 398/154
 See application file for complete search history.

(56) References Cited

U.S. PATENT DOCUMENTS 6,633,541 B1 10/2003 Hijikata et al.

FOREIGN PATENT DOCUMENTS

JP 2000-332808 11/2000
JP 2005-33537 2/2005

OTHER PUBLICATIONS

S. Kobayashi et al., "Multi-Bit Rate Passive Double Star System Using Time-Unit Packet", Journal of Lightwave Technology, vol. 19, No. 2, Feb. 2001.*

* cited by examiner

*Primary Examiner*—Shi K Li
(74) *Attorney, Agent, or Firm*—Staas & Halsey LLP (57) ABSTRACT

On an optical access network, transmission at different bit rates is realized without modifying subscriber units. A low-speed signal generating part generates a low-speed signal having a low bit rate. A high-speed signal generating part generates a high-speed signal having a high bit rate. A recovery signal generating part generates a recovery signal. A multiplex part generates and sends a multiplexed signal obtained by multiplexing the low-speed signal, the high-speed signal, and the recovery signal. A reception processing part performs processing for receiving the multiplexed signal by extracting clocks from the low-bit-rate signal. When the reception processing part enters a free running state in response to receiving the high-speed signal, the recovery signal generating part generates the recovery signal at a low bit rate in order to recover clock synchronization from the free running state.

10 Claims, 7 Drawing Sheets

TRANSMISSION SYSTEM AND TRANSMISSION APPARATUS

BACKGROUND OF THE INVENTION

1. Field of the Invention

The present invention relates to transmission systems and a transmission apparatus, and in particular, to a transmission system and a transmission apparatus for transmitting a signal on an optical access network.

2. Description of the Related Art

In recent years, with widespread use of the Internet, information communication networks have become widely used in homes and companies. Regarding optical access networks, a PON (passive optical network) has come to be widely employed as an optical access system in order to provide a higher-speed, large-capacity service.

Figure 6:
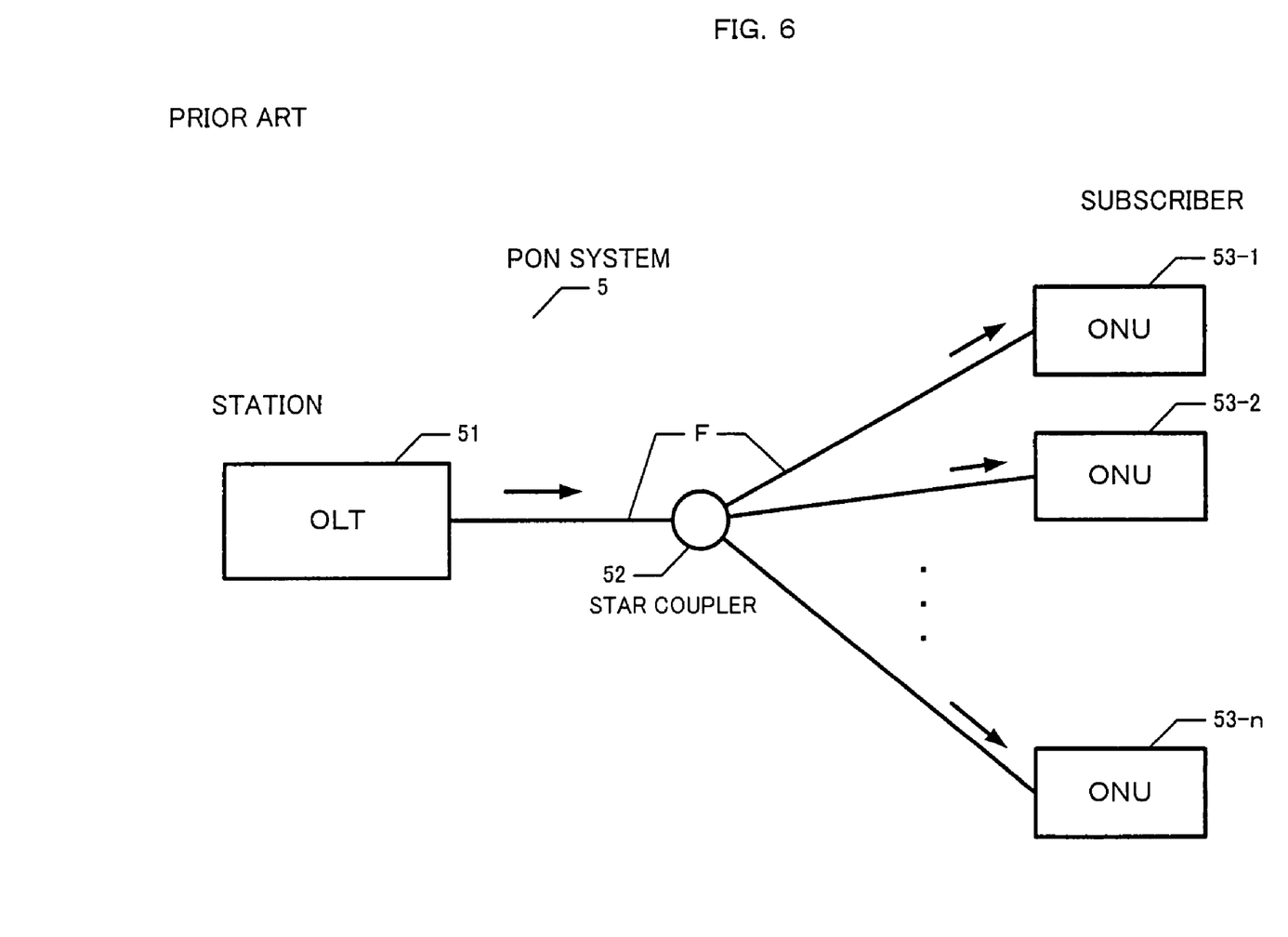
FIG. 6 is a block diagram showing the configuration of a PON.

FIG. 6 is a block diagram showing the configuration of a PON system 5. The PON system 5 includes an OLT (optical line terminal) 51 provided in a station, a star coupler 52 for performing optical demultiplication and multiplication, and ONUs (optical network units) 53-1 to 53-n provided for subscribers.

The OLT 51 is connected to the ONUs 53-1 to 53-n via the star coupler 52 with optical fibers F in a one-to-n relationship, and optical packet communication is performed between the OLT 51 and the ONUs 53-1 to 53-n. For example, when the OLT 51 transmits 2.5-GHz optical packets as downstream signals, the optical packets are distributed by the star coupler 52 to the ONUs 53-1 to 53-n, and are received by the ONUs 53-1 to 53-n.

Japanese Unexamined Patent Application Publication No. 2005-33537 (paragraph numbers [0017] to [0026], FIG. 1) proposes, as a PON system technology of the related art, a technology in which various terminal apparatuses having different speed series can be allocated in the same transmission interval of the PON.

In the PON system 5 shown in FIG. 6, when the OLT 51 sends signals having both a low bit rate and a high bit rate, one ONU, which only responds to a low bit rate, cannot perform normal reception processing. Accordingly, in the PON system of the related art, it is difficult to perform communication by using differing transmission bit rates.

Figure 7:
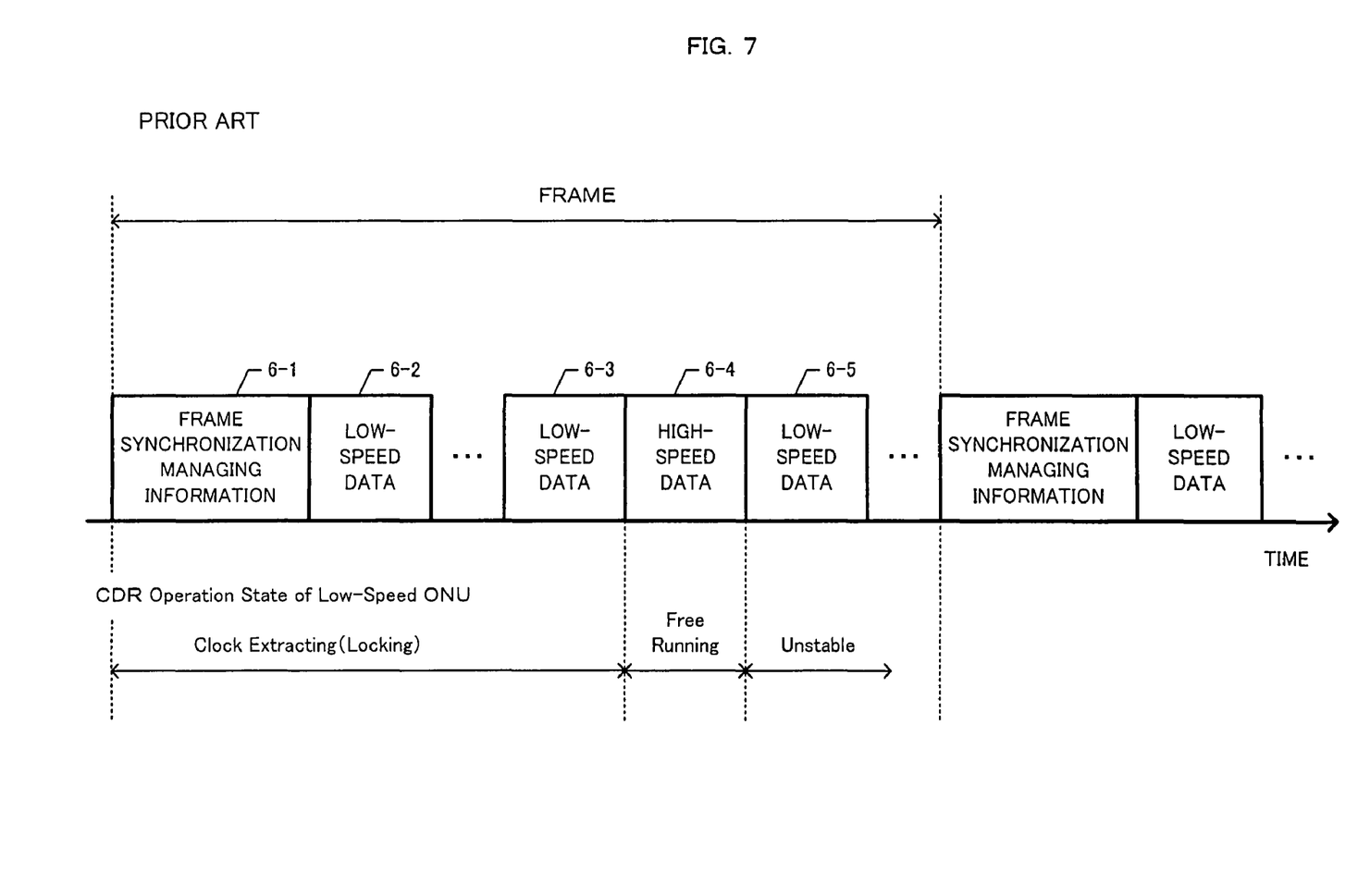
FIG. 7 is an illustration of signal reception processing of an ONU.

FIG. 7 is an illustration of signal reception processing of an ONU. When an ONU receives an optical packet, the ONU uses CDR (clock data recovery) to perform clock extraction, and reproduces transmitted data.

In addition, a frame transmitted from an OLT includes frame-synchronization managing information and data. In FIG. 7, for example, frame-synchronization managing information 6-1, and data 6-2, 6-3, and 6-5 each have a low bit rate, and data 6-4 has a high bit rate.

When an ONU having a CDR portion for a low bit rate receives the signals shown in FIG. 7, the ONU performs data reception processing while extracting clocks from the frame-synchronization managing information 6-1, and the data 6-2 and 6-3 in accordance with the low bit rate. However, when the ONU receives the data 6-4 having a high speed, the CDR portion enters a free running state. Accordingly, if, after that, the ONU receives low-speed data, clock synchronization becomes unstable. Since, in reception processing performed on the data 6-5, data reproduction is performed at unstable clocks, communication quality deteriorates.

In other words, in the PON system of the related art, when communication is performed by using differing bit rates, deterioration occurs in communication quality. Therefore, when a subscriber requests to upgrade the communication speed, ONUs of all subscribers need to be modified.

By way of example, in a case in which, in FIG. 6, the ONUs 53-1 to 53-n initially comply with 2.5-GHz communication, when it is requested that only the ONU 53-1 be able to respond to 10-GHz high-speed signals, 10-GHz high-speed signals transmitted from the OLT 51 are equally distributed to each ONU by the star coupler 52. Thus, in fact, the other ONUs 53-2 to 53-n also need to be modified to be capable of responding to 10-GHz high-speed signals. However, a necessary communication speed differs for each subscriber. For a subscriber who does not wish for upgrade, upgrade results in an increase in cost.

SUMMARY

It is an object of the present invention to provide a transmission system for performing transmission at different bit rates on the same system without adding any modification to a subscriber apparatus.

A transmission system, of the present invention, for performing signal transmission, includes a terminal apparatus and a termination unit. The terminal apparatus includes a low-speed signal generating part for generating a low-speed signal having a low bit rate, a high-speed signal generating part for generating a high-speed signal having a high bit rate, a recovery signal generating part for generating a recovery signal, and a multiplex part for transmitting a multiplexed signal composed by multiplexing the low-speed signal, the high-speed signal, and the recovery signal. The termination unit includes a reception processing part for performing processing for receiving the multiplexed signal by performing clock extraction from a low-bit-rate signal.

When the signal received by the reception processing part changes from a low-speed signal to a high-speed signal, the extracted clock enters a free running state. When the reception processing part enters a free running state in response to receiving the high-speed signal, the recovery signal generating part generates the recovery signal at a low bit rate in order to recover clock synchronization from the free running state.

In a transmission system of the present invention, in a case in which a termination unit that can receive a low-speed signal receives a high-speed signal and a reception processing part enters a free running state; in order to recover clock synchronization from the clock free running state of the termination unit, the terminal apparatus generates a low-bit-rate recovery signal, multiplexes the high-speed signal, the low-speed signal, and the recovery signal, and sends the multiplexed signal. In this manner, even if a high-speed signal is inserted during transmission of low-speed signals, stable communication can be performed, and transmission at different bit rates of high and low bit rates on the same system without adding any modification to a subscriber apparatus.

DESCRIPTION OF THE PREFERRED EMBODIMENTS

An embodiment of the present invention is described below with reference to the accompanying drawings.

Figure 1:
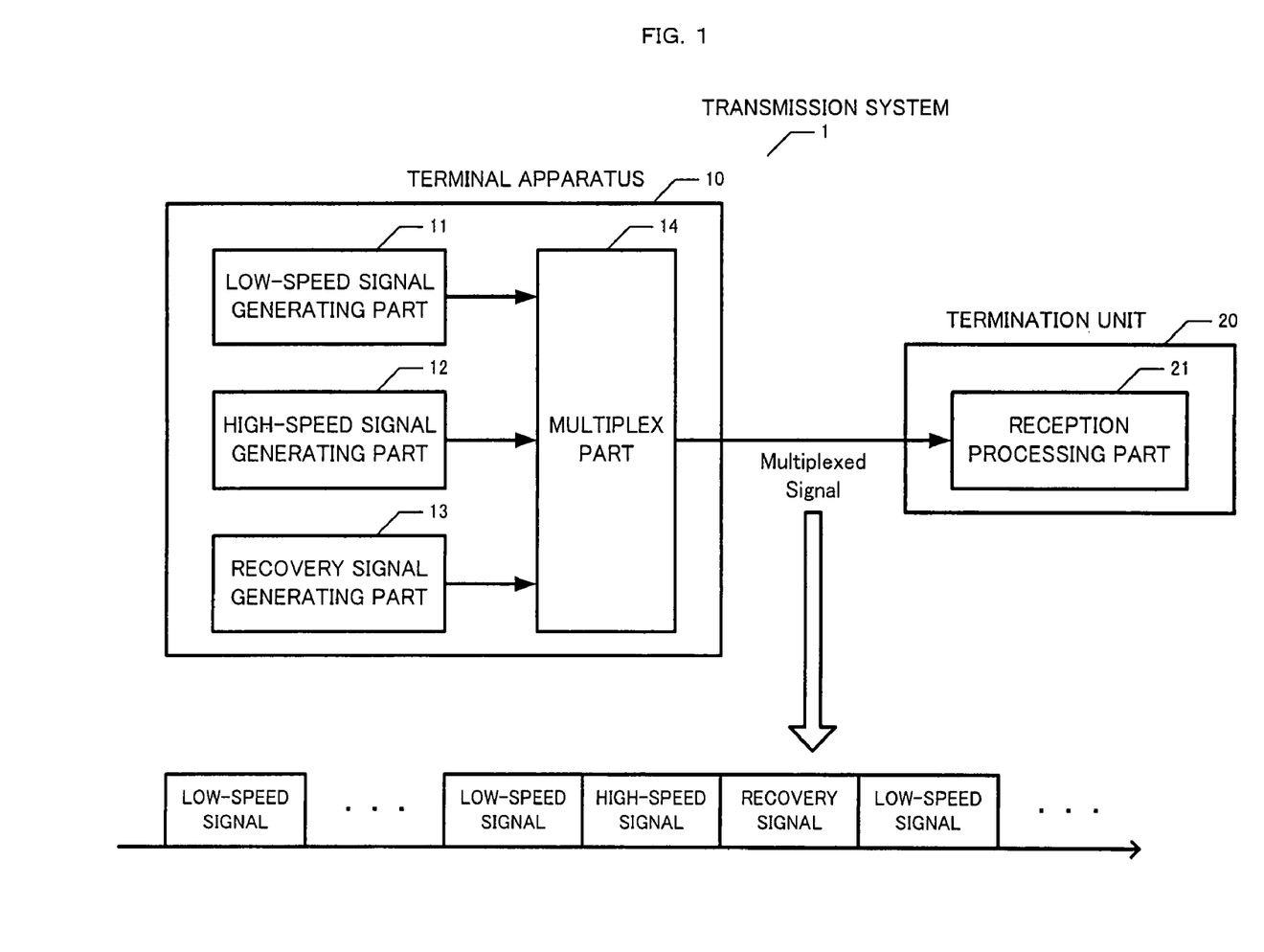
FIG. 1 is a block diagram showing the principle of a transmission system.

FIG. 1 is a block diagram showing the principle of a transmission system 1. The transmission system 1 includes a terminal apparatus 10 and a termination unit 20. The terminal apparatus 10 includes a low-speed signal generating part 11, a high-speed signal generating part 12, a recovery signal generating part 13, and a multiplex part 14. The termination unit 20 includes a reception processing part 21.

The low-speed signal generating part 11 generates a low-speed signal having a low bit rate. The high-speed signal generating part 12 generates a high-speed signal having a high bit rate. When the reception processing part 21 enters a free running state in response to receiving a high-speed signal, the recovery signal generating part 13 generates a low-bit-rate recovery signal for recovering clock synchronization from the free running state.

The multiplex part 14 generates and sends a multiplexed signal obtained by multiplexing the low-speed signal, the high-speed signal, and the recovery signal.

Also, the reception processing part 21 in the termination unit 20 performs reception processing by performing clock extraction according to the low bit rate.

Figure 2:
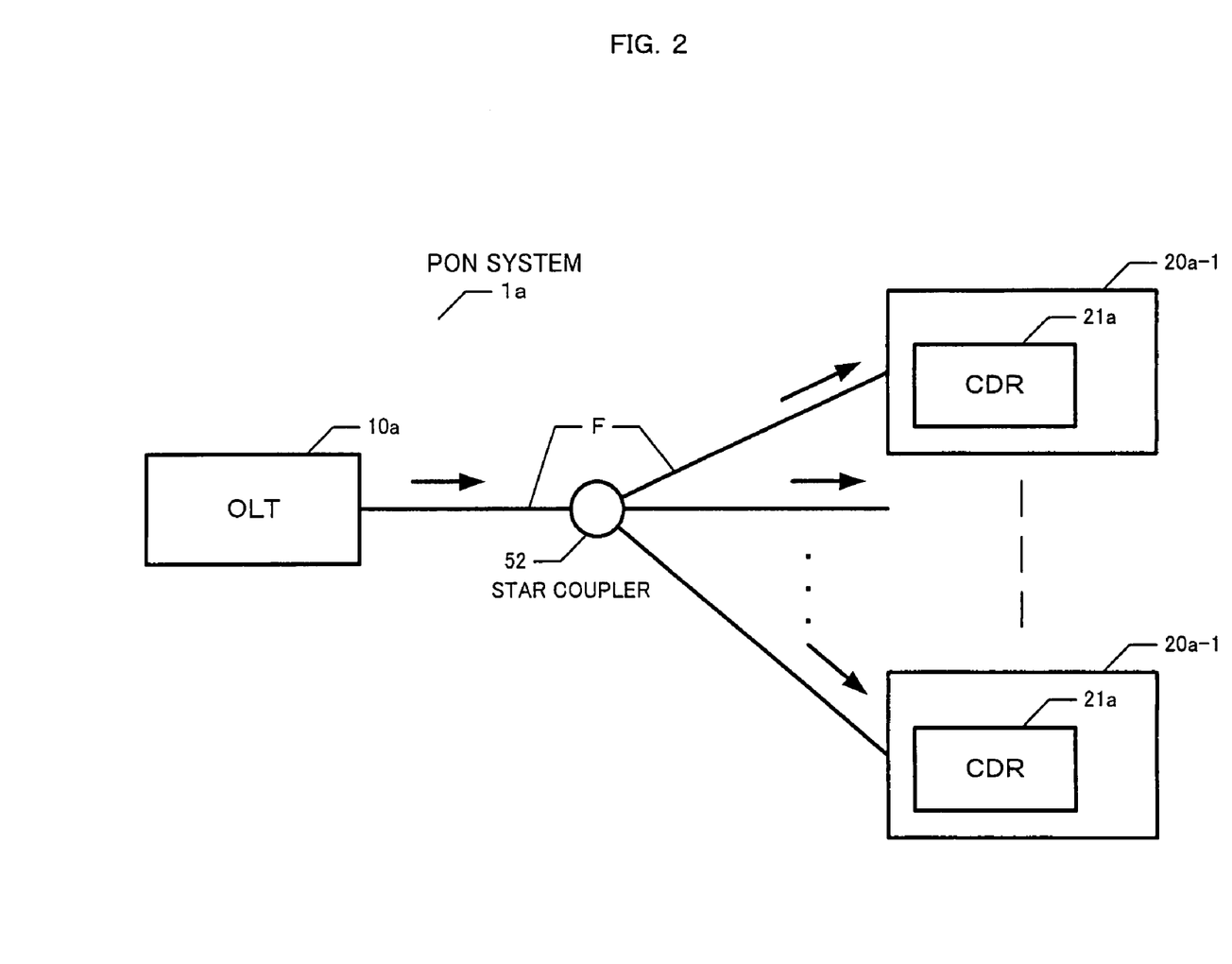
FIG. 2 is a block diagram showing the configuration of a PON system.

Next, the configuration and operation of a PON system 1a obtained by applying the transmission system 1 to a PON system are described below. FIG. 2 is a block diagram showing the configuration of the PON system 1a. An OLT 10a in the PON system 1a corresponds to the terminal apparatus 10 shown in FIG. 1, and each of ONUs 20a-1 to 20a-n corresponds to the termination unit 20 shown in FIG. 1.

The PON system 1a includes the OLT 10a, which is provided on a station side, a star coupler 52 for performing optical demultiplication and multiplication, and the ONUs 20a-1 to 20a-n (collectively called "ONU 20a"), which are provided on a subscriber side.

The OLT 10a is connected to the ONUs 20a-1 to 20a-n via the star coupler 52 with optical fibers F in a one-to-n relationship, and optical packet communication is performed between the OLT 10a and the ONUs 20a-1 to 20a-n. For example, each of the ONUs 20a-1 to 20a-n includes a CDR portion 21a (corresponding to the reception processing part 21 shown in FIG. 1) that receives a signal having a low bit rate for 2.5 GHz and performs clock extraction.

Figure 3:
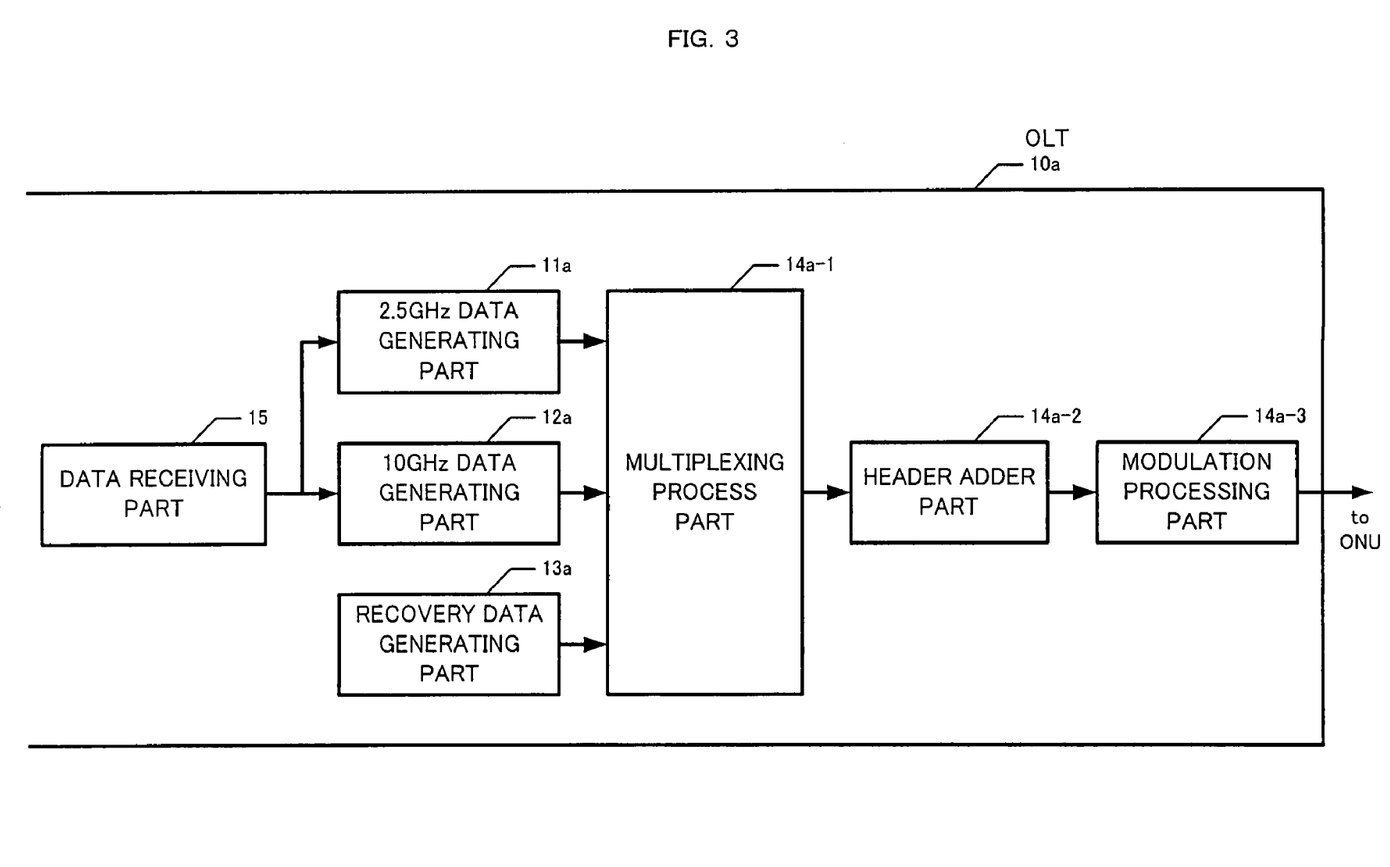
FIG. 3 is a block diagram showing the configuration of an OLT.

FIG. 3 is a block diagram showing the configuration of the OLT 10a. For example, the bit rate of the low-speed signal has 2.5 GHz, and the bit rate of the high-speed signal has 10 GHz. The OLT 10a includes a data receiving part 15, a 2.5-GHz data generating part 11a, a 10-GHz data generating part 12a, a recovery data generating part 13a, a multiplexing process part 14a-1, a header adder part 14a-2, and a modulation processing part 14a-3.

The 2.5-GHz data generating part 11a corresponds to the low-speed signal generating part 11 shown in FIG. 1. The 10-GHz data generating part 12a corresponds to the high-speed signal generating part 12 shown in FIG. 1. The recovery data generating part 13a corresponds to the recovery signal generating part 13 shown in FIG. 1. The multiplexing process part 14a-1, the header adder part 14a-2, and the modulation processing part 14a-3 realize a function of the multiplex part 14 shown in FIG. 1.

When receiving data from an external network, on the basis of an instruction from an upper level (not shown), the data receiving part 15 transmits the data to the 2.5-GHz data generating part 11a or the 10-GHz data generating part 12a.

When receiving the data, the 2.5-GHz data generating part 11a generates low-speed data having a low bit rate for 2.5 GHz. When receiving the data, the 10-GHz data generating part 12a generates high-speed data having a high bit rate for 10 GHz.

The recovery data generating part 13a generates recovery data, having a low bit rate for 2.5 GHz, for recovering clock synchronization before 10-GHz high-speed data is received by the CDR portion 21a to cause desynchronization. The recovery data includes, for example, a signal string in which zeros and ones are alternately arranged.

The multiplexing process part 14a-1 multiplexes the low-speed data, the high-speed data, and the recovery data, and the header adder part 14a-2 adds header information, whereby multiplexed data is generated. Recovery addition has two methods, addition of the recovery data immediately after the high-speed data, and addition of the recovery data immediately before all the low-speed data. The modulation processing part 14a-3 performs E/O (electrical/optical) conversion on the multiplexed data, modulates the multiplexed data, and outputs the modulated data. The output optical data is distributed to each of the ONUs 20a-1 to 20a-n, and reception processing is performed.

Next, signal reception processing of the ONU 20a is described. In the OLT 10a, recovery data addition has the two forms shown in FIGS. 4 and 5. Accordingly, each case is described below.

Figure 4:
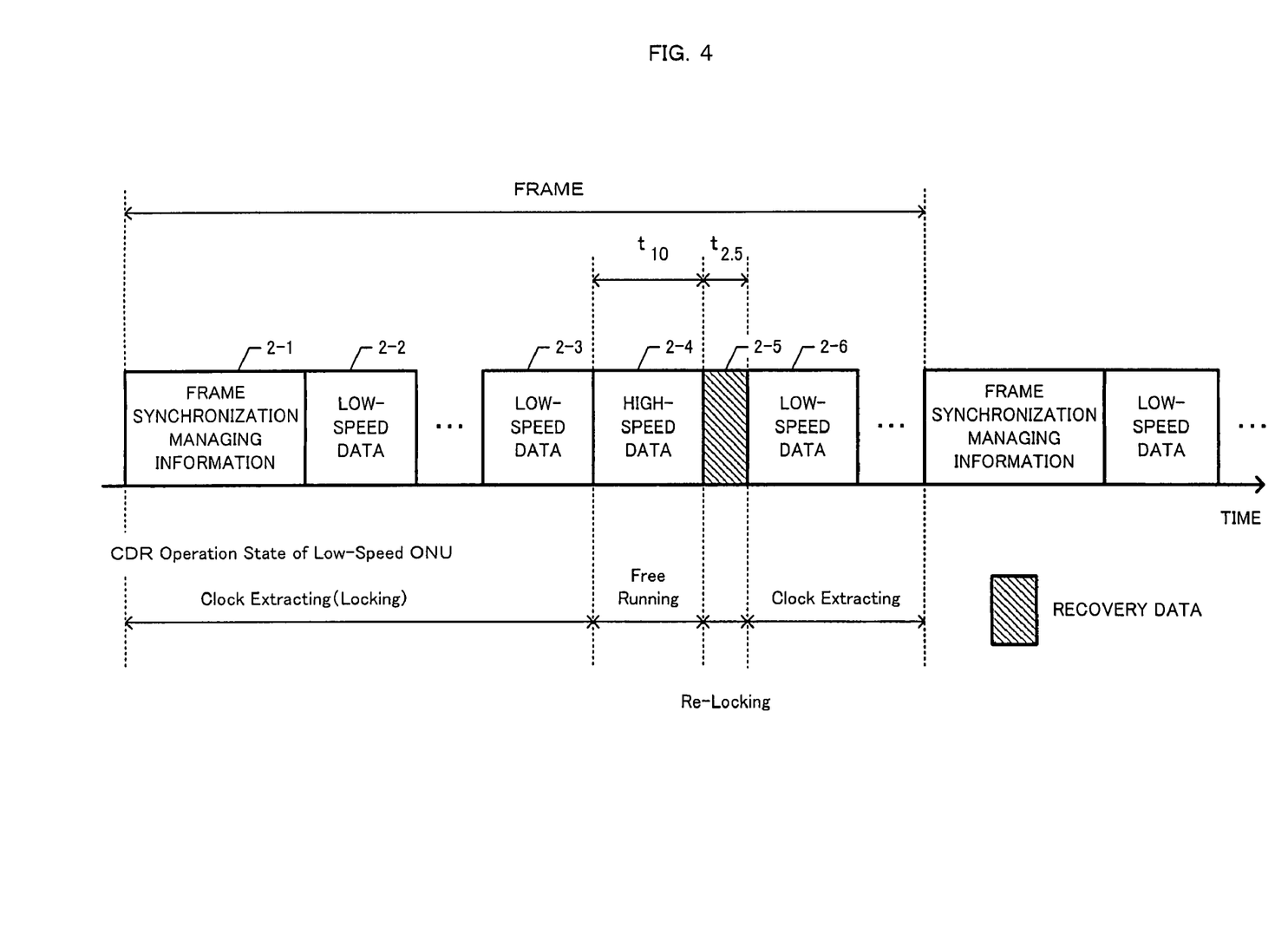
FIG. 4 is an illustration of signal reception processing of an ONU.

FIG. 4 is an illustration of the signal reception receiving process of the ONU 20a. FIG. 4 shows processing for receiving multiplexed data in which recovery data is added immediately after high-speed data. When the ONU 20a receives the multiplexed data, the ONU 20a uses the CDR portion 21a to perform clock extraction, and performs data reception.

A frame transmitted from the OLT 10a includes frame-synchronization managing information, low-speed data, high-speed data, and recovery data. In FIG. 4, each of frame-synchronization managing information 2-1, low-speed data 2-2, 2-3, and 2-6, and recovery data 2-5 is 2.5-GHz data having a low bit rate. High-speed data 2-4 is 10-GHz data having a high bit rate.

When the ONU 20a that includes the CDR portion 21a for a low bit rate for 2.5 GHz receives the signal shown in FIG. 4, the ONU 20a extracts clocks from low-bit-rate signals, that is, the frame-synchronization managing information 2-1, the low-speed data 2-2 and 2-3, and performs data reception processing. Also, when the ONU 20a receives the high-speed data 2-4, the ONU 20a cannot extract a low-bit-rate clock. Thus, the CDR portion 21a enters a free running state and performs the reception processing on the basis of a free running clock.

In addition, since the recovery data, which has a low bit rate, is added immediately after the high-speed data 2-4, when the CDR portion 21a receives the recovery data 2-5, the CDR portion 21a extracts a clock from a low-bit-rate signal of the recovery data 2-5. Therefore, clock synchronization is re-established (re-locked) in an interval of the recovery data 2-5. Thus, from the next low-speed data 2-6, low-speed clocks are extracted, with synchronization established, whereby stable data reception processing can be performed.

Here, an interval of the high-speed data 2-4 is represented by $t_{10}$, and an interval of the recovery data 2-5 is represented by $t_{2.5}$. In this case, immediately after the high-speed data 2-4, the (low-bit-rate) recovery data 2-5 is added, which has such a signal interval that, for the entirety of the intervals of the high-speed data 2-4 and the recovery data 2-5, the high-speed data 2-4 occupies approximately 75% ($=t_{10}/(t_{10}+t_{2.5}))\times 100$) and the recovery data 2-5 occupies approximately 25% ($=t_{2.5}/(t_{10}+t_{2.5})\times 100$). From an experiment result, it is recognized that, in the interval of the recovery data 2-5, the CDR portion 21a re-locks from free running clocks to low-bit-rate clocks.

Therefore, in general, the recovery data generating part 13a in the OLT 10a may generate recovery data having such a signal interval that $(t_L/(t_H+t_L))\times 100$ is 20 to 25(%), where $t_H$ represents a high-speed data interval, and $t_L$ represents a recovery data interval.

Figure 5:
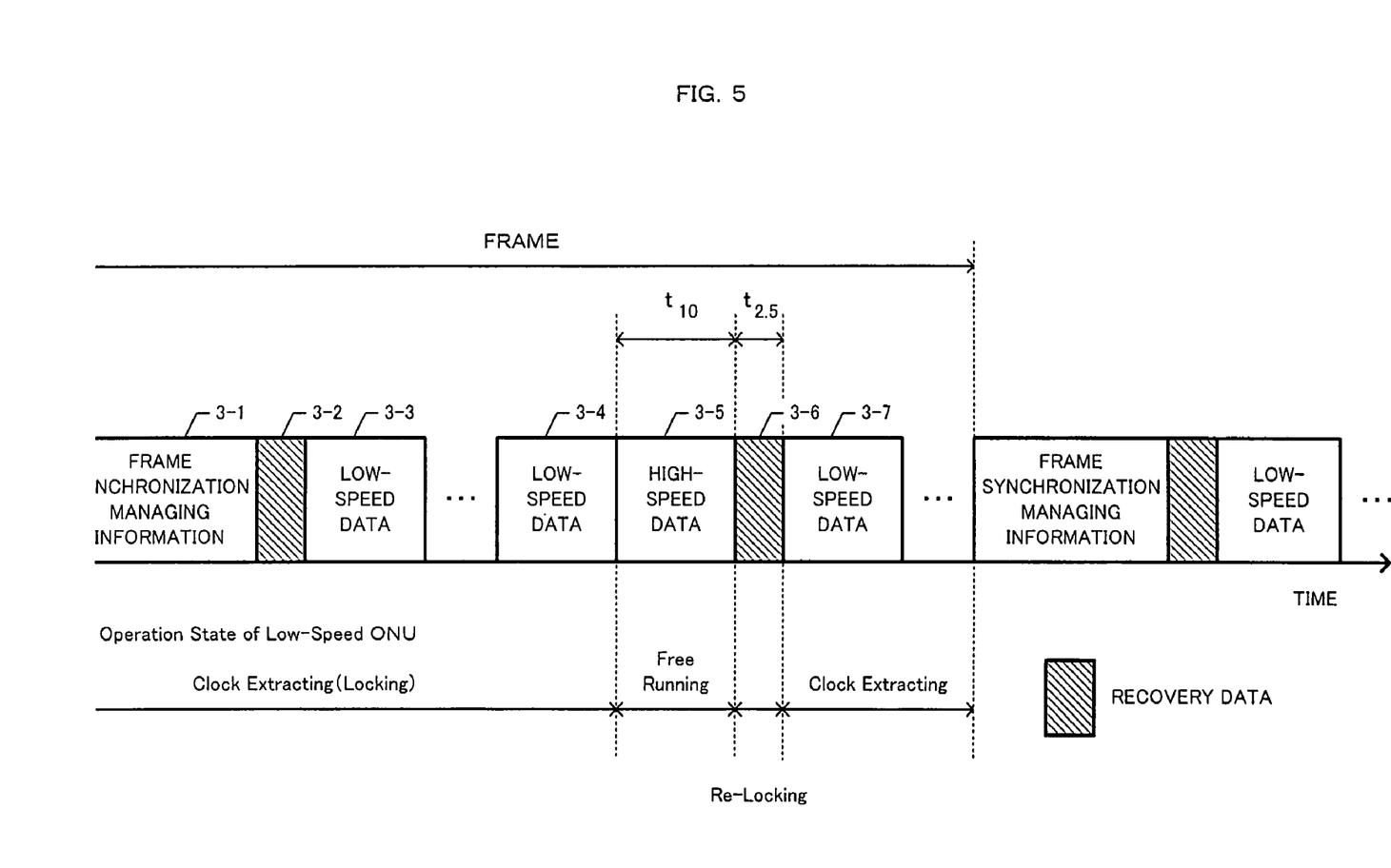
FIG. 5 is an illustration of signal reception processing of the ONU.

FIG. 5 is an illustration of signal reception processing of the ONU 20a. FIG. 5 shows processing for receiving multiplexed data in which recovery data is added immediately before all low-speed data (the recovery data is inserted as a preamble signal of the low-speed data). When the ONU 20a receives multiplexed data, the ONU 20a uses the CDR portion 21a to perform clock extraction and perform data reproduction.

A frame transmitted from the OLT 10a includes frame-synchronization managing information, low-speed data, high-speed data, and recovery data. In FIG. 5, for example, each of frame-synchronization managing information 3-1, low-speed data 3-3, 3-4, and 3-7, and recovery data 3-2 and 3-6 is 2.5-GHz data having a low bit rate, and the high-speed data 3-5 is 10-GHz data having a high bit rate.

When the ONU 20a that includes the CDR portion 21a for a low bit rate for 2.5 GHz receives the signal shown in FIG. 5, the ONU 20a extracts clocks from low-bit-rate signals, that is, the frame-synchronization managing information 3-1, the recovery data 3-2, and the low-speed data 3-3 and 3-4, and performs data reception processing. Also, when the ONU 20a receives the high-speed data 3-5, the CDR portion 21a enters a free running state, and processing for receiving the high-speed data 3-5 is performed on the basis of free running clocks.

In addition, since the recovery data is added immediately before all the low-speed data, the recovery data 3-6, which has a low bit rate, is positioned immediately after the high-speed data 3-5. When the CDR portion 21a receives the recovery data 3-6, the CDR portion 21a extracts a clock from a low-bit-rate signal of the recovery data 3-6. Therefore, clock synchronization is re-established (re-locked) in an interval of the recovery data 3-6. Thus, from the next low-speed data 3-7, low-speed clocks are extracted, with synchronization established, whereby stable data reception processing can be performed.

Similarly to the case of FIG. 4, also in the case of FIG. 5, the recovery data has such a signal interval that $(t_{2.5}/(t_{10}+t_{2.5}))\times 100$ is 20 to 25%, where $t_{10}$ represents a high-speed data interval, and $t_{2.5}$ represents a recovery data interval. The recovery data are added immediately before the low-speed data.

As described above, according to the present invention, the OLT 10a generates a low-bit-rate recovery signal for recovering clock synchronization before high-speed data is received by the ONUs 20a-1 to 20a-n to cause desynchronization, multiplexes the high-speed data, low-speed data, and recovery data, and sends the multiplexed data to the ONUs 20a-l to 20a-n.

In addition, when each of the ONUs 20a-1 to 20a-n only including the CDRs 21a for low bit rates receives a high-speed signal, the CDR portion 21a enters a free running state and performs processing for receiving the high-speed signal on the basis of free running clocks. For a subsequent low-speed signal, reception processing is performed on the basis of clocks stabilized by re-locking based on a recovery signal.

This eliminates an interval in which reception processing is performed on the basis of free running clocks for low-speed signals occupying most of transmitting signals. Thus, even if a high-speed signal is inserted during low-speed signal transmission, stable communication can be performed, thus enabling prevention of deterioration in communication quality.

In addition, by employing the above-described system configuration, by only modifying the OLT 10a, high-speed and low-speed signals having different bit rates can be transmitted on the same system without adding any modification to the ONUs 20a-1 to 20a-n as subscriber units.

What is claimed is:

1. A transmission system comprising:
   a terminal apparatus; and
   a termination unit,
      the terminal apparatus including:
         a low-speed signal generating part for generating a low-speed signal having a low bit rate;
         a high-speed signal generating part for generating a high-speed signal having a high bit rate;
         a recovery signal generating part for generating a recovery signal; and
         a multiplex part for transmitting a multiplexed signal composed by multiplexing the low-speed signal, the high-speed signal, and the recovery signal,
      the termination unit including:
         a reception processing part for performing processing for receiving the multiplexed signal by performing clock extraction according to the low bit rate,
         wherein the recovery signal generating part generates the recovery signal at the low bit rate so as to recover clock synchronization from a free running state, when the reception processing part enters the free running state of clock in response to receiving the high-speed signal.

2. The transmission system according to claim 1,
wherein the multiplex part adds the recovery signal immediately after the high-speed signal.

3. The transmission system according to claim 1,
wherein the multiplex part adds the recovery signal immediately before the low-speed signal.

4. The transmission system according to claim 1,
wherein the recovery signal generating part generates the recovery signal including a signal in which logic level "0" and logic level "1" are alternately arranged.

5. The transmission system according to claim 1,
wherein the recovery signal generating part generates the recovery signal including a signal interval that $(t_H/(t_H+t_L))\times 100$ is 20 to 25(%),
   wherein $t_H$ represents an interval of the high-speed signal, and $t_L$ represents an interval of the low-speed signal.

6. An optical transmission system for transmitting on an optical access network, the optical transmission system comprising:
   an optical subscriber-line terminal apparatus; and
   a plurality of optical subscriber-line termination unit,
      the optical subscriber-line terminal apparatus including:
         a low-speed signal generating part for generating a low-speed signal having a low bit rate;

a high-speed signal generating part for generating a high-speed signal having a high bit rate;
a recovery signal generating part for generating a recovery signal; and
a multiplex part for transmitting a multiplexed signal composed by multiplexing the low-speed signal, the high-speed signal, and the recovery signal,
the optical subscriber-line termination unit including:
a reception processing part for performing processing for receiving the multiplexed signal by performing clock extraction according to the low bit rate,
the optical subscriber-line termination unit connecting to the optical subscriber-line terminal apparatus through a star coupler,
wherein the recovery signal generating part generates the recovery signal at the low bit rate so as to recover clock synchronization from a free running state, when the reception processing part enters the free running state of clock in response to receiving the high-speed signal.

7. The transmission system according to claim 6, wherein the multiplex part adds the recovery signal immediately after the high-speed signal.

8. The transmission system according to claim 6, wherein the multiplex part adds the recovery signal immediately before the low-speed signal.

9. The transmission system according to claim 6, wherein the recovery signal generating part generates the recovery signal including a signal in which logic level "0" and logic level "1" are alternately arranged.

10. The transmission system according to claim 6, wherein the recovery signal generating part generates the recovery signal including a signal interval that $(t_H/(t_H+t_L))\times 100$ is 20 to 25(%),
wherein $t_H$ represents an interval of the high-speed signal, and $t_L$ represents an interval of the low-speed signal.

* * * * *